(12) United States Patent
Campbell et al.

(10) Patent No.: US 8,293,688 B2
(45) Date of Patent: Oct. 23, 2012

(54) ENHANCED OIL RECOVERY SURFACTANT COMPOSITION AND METHOD OF MAKING THE SAME

(75) Inventors: Curtis Bay Campbell, Hercules, CA (US); Yat Fan Suen, Pinole, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 224 days.

(21) Appl. No.: 12/859,367

(22) Filed: Aug. 19, 2010

(65) Prior Publication Data

US 2011/0046024 A1    Feb. 24, 2011

Related U.S. Application Data

(60) Provisional application No. 61/274,104, filed on Aug. 20, 2009.

(51) Int. Cl.
*C09K 8/60* (2006.01)
(52) U.S. Cl. .......... 507/213; 507/219; 507/225
(58) Field of Classification Search .......... None
See application file for complete search history.

(56) References Cited

U.S. PATENT DOCUMENTS

| | | | | |
|---|---|---|---|---|
| 2,058,504 | A | * | 10/1936 | Rauschert .......... 562/82 |
| 4,018,278 | A | * | 4/1977 | Shupe .......... 166/252.1 |
| 4,469,604 | A | * | 9/1984 | Stapp et al. .......... 507/259 |
| 5,282,858 | A | | 2/1994 | Bisch et al. |
| 6,022,843 | A | | 2/2000 | Shanks et al. |
| 7,183,452 | B2 | | 2/2007 | Campbell et al. |
| 2005/0199395 | A1 | | 9/2005 | Berger et al. |
| 2006/0058199 | A1 | * | 3/2006 | Berger et al. .......... 507/259 |

OTHER PUBLICATIONS

Basic Concepts in Enhanced Oil Recovery Processes edited by M. Baviere (published for SCI by Elsevier Applied Science, London and New York, 1991).
Rosemarie Szostak's Handbook of Molecular Sieves (New York, Van Nostrand Reinhold, 1992).
Jackson, A.C. "Experimental Study of the Benefits of Sodium Carbonate on Surfactants for Enhanced Oil Recovery." MSE Thesis, University of Texas at Austin, Dec. 2006).

* cited by examiner

*Primary Examiner* — Randy Gulakowski
*Assistant Examiner* — Jeffrey Washville
(74) *Attorney, Agent, or Firm* — Josetta I. Jones

(57) ABSTRACT

The present invention is directed to an enhanced oil recovery composition comprising (a) a surfactant comprising an alkylated hydroxyaromatic sulfonate having the general formula:

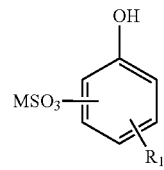

wherein $R_1$ is an alkyl group containing from about 8 to 40 carbon atoms and having from about 20% to about 50% methyl branching, and M is a mono-valent cation; (b) a solvent; (c) a passivator; and (d) a polymer.

18 Claims, No Drawings

ENHANCED OIL RECOVERY SURFACTANT COMPOSITION AND METHOD OF MAKING THE SAME

The present invention is directed to the recovery of oil from subterranean petroleum reservoirs, and more particularly, to an enhanced oil recovery surfactant composition and a method of making the same. The present invention is also directed to a method for enhancing the recovery of oil from a subterranean reservoir which method employs the enhanced oil recovery surfactant composition of the present invention.

BACKGROUND OF THE INVENTION

Crude oil production from oil in subterranean reservoirs may involve use of various flooding methods as the natural forces, which are used in the "primary recovery" process, become depleted. A large portion of the crude oil may have to be driven out of the formation in "secondary" or "tertiary" recovery processes. In addition, some reservoirs may not have sufficient natural forces for oil production even by primary recovery processes. The production of crude oil using such flooding methods is one example of enhanced oil recovery process.

Currently, the petroleum industry is re-evaluating technologies that will improve the ability to recover remaining and untapped oil from the subterranean reservoirs. Injecting a displacing fluid or gas may begin early, long before the complete depletion of the field by primary recovery processes. Methods for improving displacement efficiency or sweep efficiency may be used at the very beginning of the first injection of a displacing fluid or gas, rather than under secondary and tertiary recovery conditions.

The easiest method of flooding a subterranean reservoir for the production of crude oil is by injecting a liquid or a gas into the well to force the oil to the surface. Water flooding is the most widely used fluid. However, water does not readily displace oil because of the high interfacial tension between the two liquids which result in high capillary pressure that trap in porous media.

The addition of chemicals to modify the properties of the flooding liquid is well known in the art of improved/enhanced oil recovery. Surfactants are one class of chemical compounds that have been used in aqueous media for enhanced oil recovery. Surfactants have been found to effectively lower the interfacial tension between oil and water and enable mobilization of trapped oil through the reservoir.

Alkylaryl sulfonates have been used as surfactants for enhanced oil recovery. They have been used in surfactant flooding, alone, or in conjunction with co-surfactants and/or sacrificial agents. Alkylaryl sulfonates are generally used not only because they are able to lower the interfacial tension between oil and water, but also because when used in conjunction with varying amounts of other salts, such as, sodium chloride they exhibit desirable phase behavior. Depending on the molecular weight and molecular weight distribution, branching and point of attachment of the aryl group to the alkyl groups, alkylaryl sulfonates can be tailored to preferentially reside in the aqueous or oleic phases at different electrolyte concentrations, i.e., salinities. At low salinities the alkylayrl sulfonates tend to reside in water and at high salinities they partition more into the oil. At intermediate salinities the alkylaryl sulfonates can result in the formation of micellar solutions. In either case, the swollen micellar solutions that contain sufactants, oil and water are termed microemulsions. At optimal salinity an equal volume of oil and water are solubilized in the microemulsion. For well tailored and matched alkylaryl sulfonates, the high volumes of oil and water solubilized in the microemulsion result in ultra-low interfacial tensions that provide potential for high oil recovery from reservoirs.

The salinity of the water in subterranean hydrocarbon reservoirs may vary a great deal. For example, the Minas oil field in Indonesia has total dissolved salts of between 0.2 and 0.3 weight percent. Other reservoirs may have salinities as high as or higher than 2.0 percent sodium chloride and over 0.5 percent calcium chloride and magnesium chloride. It is desirable to optimize the alkylaryl sulfonates for surfactant flooding for enhanced oil recovery for a particular reservoir by evaluating tailored versions of the alkylaryl sulfonates with native reservoir brine and reservoir oil under reservoir conditions via phase behavior experiments. In addition to the phase behavior experiments a few interfacial tension measurements are needed to verify that the interfacial tensions are acceptably low. In addition to testing the surfactants with native reservoir brines, additional tests with injected solutions are needed, especially since, in some instances, the injectate brine is different from native reservoir brines.

Generally, pure alkylaryl sulfonates, that is, those having a narrow range of molecular weights, are useful for recovery of light crude oils. Such alkylaryl sulfonates have exhibited poor phase behavior, i.e., poor potential to recover oils, containing high wax content. Oils with typically high wax content generally have high equivalent average carbon numbers (EACN's). The equivalent alkane carbon number (EACN) is a representation of an average carbon chain length of a hydrocarbon mixture. As an illustration, pentane, hexane and heptane have alkane carbon numbers of 5, 6 and 7 respectively. However a mixture containing 1 mole of pentane and one mole of hexane would have an EACN of 5.5. Field crude oils are complex mixtures but when interacting with surfactants, they behave as a single component fluid with an EACN that is a mole fraction average of its constituents.

Alkylaryl sulfonates having a broad spectrum of carbon chain lengths in the alkyl group are more desirable for use to recover waxy crude oils or crude oils with high equivalent average carbon numbers (EACN's). In addition to optimizing the molecular weight and/or molecular weight distribution of an alkylaryl sulfonate to maximize the amount of oil in the aforementioned micro-emulsion, the use of other components in combination with the alkylarylsulfonate, such as inorganic salts, co-solvents, polymeric materials and co-surfactants may improve phase behavior. The performance of an enhanced oil recovery composition may also be measured by the oil solubilization parameter, which the volume of oil dissolved per unit volume of surfactant. The oil solubilization is inversely proportional to the interfacial tensions. In addition the performance is also measure by the ability of the formulation to achieve stable microemulsions and low interfacial tensions rapidly, i.e., in less than one day in the laboratory.

Surfactant formulations used in enhancing the oil production of reservoirs traditionally contained varying amounts of co-solvents. For example, the formulation to be used in the Minas SFT-2 surfactant field test contains about 4% of the a solvent. The cost of the solvent contributes significantly to the overall cost of the formulation. The solvent is needed to maintain what is referred to as aqueous stability (which is the stability of the surfactant formulation diluted in the reservoir brine). Reducing the amount of solvent required is advantageous.

A number of patents and patent applications have discussed methods for enhanced oil recovery using surfactant flooding. In addition to the use of surfactants, there are a number of patent and patent applications discussing the use of co-surfactants and sacrificial agents for enhanced oil recovery.

Hsu et al., U.S. Pat. No. 6,022,843 discloses an improved concentrated surfactant formulation and process for the recovery of residual oil from subterranean petroleum reservoirs, and more particularly an improved alkali surfactant flooding process which results in ultra-low interfacial tensions between the injected material and the residual oil, wherein the concentrated surfactant formulation is supplied at a concentration above, at, or, below its critical micelle concentration, also providing in situ formation of surface active material formed from the reaction of naturally occurring organic acidic components with the injected alkali material which serves to increase the efficiency of oil recovery.

Berger et al., U.S. Published Patent Application No. 2005/0199395A1 discloses an oil recovery process and a particular class of alkylaryl sulfonate surfactants. The surfactants are derived from an alpha-olefin stream having a broad distribution of even carbon number ranging from 12 to 28 or more.

A general treatise on enhanced oil recovery is *Basic Concepts in Enhanced Oil Recovery Processes* edited by M. Baviere (published for SCI by Elsevier Applied Science, London and New York, 1991).

SUMMARY OF THE INVENTION

The present invention is directed to an enhanced oil recovery composition comprising
  (a) a surfactant comprising an alkylated hydroxyaromatic sulfonate having the general formula:

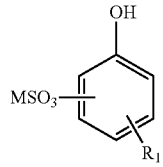

wherein $R_1$ is an alkyl group containing from about 8 to 40 carbon atoms and having from about 20% to about 50% methyl branching, and M is a mono-valent cation;
  (b) a solvent;
  (c) a passivator; and
  (d) a polymer.

The present invention is also directed to a method of making an enhanced oil recovery composition comprising mixing
  (a) a surfactant comprising an alkylated hydroxy aromatic sulfonate having the general formula:

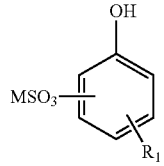

wherein $R_1$ is an alkyl group containing from about 8 to 40 carbon atoms and having from about 20% to about 50% methyl branching, and M is a mono-valent cation;
  (b) a solvent;
  (c) a passivator; and
  (d) a polymer.

The present invention is also directed to a method of recovering crude oil from a subterranean hydrocarbon-containing formation which comprises
  (i) injecting into said formation an enhanced oil recovery composition comprising
    (a) an alkylated hydroxyaromatic sulfonate having the general formula:

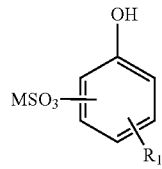

wherein $R_1$ is an alkyl group containing from about 8 to 40 carbon atoms and having from about 20% to about 50% methyl branching, and M is a mono-valent cation;
    (b) a solvent;
    (c) a passivator; and
    (d) a polymer, and
  (ii) recovering the crude oil from one or more production wells.

It has been found that when an alkylated hydroxyaromatic sulfonate is employed in the enhanced oil recovery surfactant formulation, the amount of solvent used can be reduced significantly. The Applicant has discovered that less solvent is used while approximately maintaining, or increasing, the amount of oil recovered when sodium hydroxyl sulfonate is employed in the enhanced oil recovery surfactant formulation.

DETAILED DESCRIPTION OF THE INVENTION

Definitions

As used herein, the following terms have the following meanings unless expressly stated to the contrary:

The term "primary surfactant" as used herein refers to the anionic aromatic surfactant that is present in the composition.

The term "co-surfactant" as used herein refers to the anionic non-aromatic surfactant that is present in the composition.

The terms "active" or "actives" as used herein refers to the concentration of the sodium salts of each surfactant species (i.e., primary surfactant or co-surfactant).

The term "alkylate" as used herein refers to the alkylated hydroxy aromatic compound used to prepare the alkylated hydroxy aromatic sulfonates of the present invention. The alkylated hydroxy aromatic compound was prepared by alkylating a hydroxyl compound with a linear alpha olefin or an isomerized olefin.

The term "isomerized alpha olefin (IAO)" as used herein refers to an alpha olefin that has been subjected to isomerization conditions which results in an alteration of the distribution of the olefin species present and/or the introduction of alkyl branching along the alkyl chain. The isomerized olefin product may be obtained by isomerizing a linear alpha olefin containing from about 12 to about 40 carbon atoms, and more preferably from about 20 to about 24 carbon atoms.

The term "alkali metal" as used herein refers to Group IA metals of the Periodic Table.

The term "solvent" as used herein refers to alcohols, ethers and/or a range of nonionic materials. Generally these non-ionic materials have a somewhat higher tolerance to polyvalent ions, are water-soluble and may also provide a reduction in viscosity of the surfactant formulation.

The term "passivator" as used herein refers to alkali metal carbonate, bicarbonate or hydroxide salts.

The terms "enhanced oil recovery" or "EOR" as used herein refer to processes for enhancing the recovery of hydrocarbons from subterranean reservoirs.

The term oil solubilization parameter "SPo" refers to the volume of oil dissolved per unit volume of surfactant. Typically, oil solubilization parameter is measure via phase behavior experiments.

The terms "interfacial tension" or "IFT" as used herein refer to the surface tension between test oil and water of different salinities containing a surfactant composition at different concentrations. Typically, interfacial tensions are measured using a spinning drop tensiometer or calculated from phase behavior experiments.

The term "Middle Phase" refers to the micro-emulsion formed by combining test oil and the reservoir brine containing the surfactant composition during phase behavior testing.

The term "2-alkyl attachment" refers to attachment of the alkyl group on the aromatic ring wherein the longest alkyl chain is attached to the aromatic ring at the 2-position on the alkyl chain.

Unless otherwise specified, all percentages are in weight percent and the pressure is in atmospheres.

The present invention is directed to an enhanced oil recovery surfactant composition comprising a surfactant, a solvent, a polymer, a passivator and optionally a co-surfactant, a method of making the enhanced oil recovery surfactant composition; and a method of recovering crude oil from a subterranean hydrocarbon-containing formation.

The Surfactant

The surfactant of the present invention has the general formula:

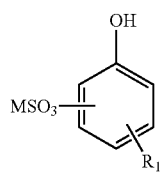

wherein $R_1$ is an alkyl group containing from about 8 to 40 carbon atoms and having from about 20% to about 50% methyl branching, and M is a mono-valent cation. In one embodiment, M is an alkali metal, ammonium, or substituted ammonium.

Preferably, the alkali metal is an alkali earth metal; more preferably, the alkali metal is an alkali metal hydroxide, such as but not limited to, sodium hydroxide or potassium hydroxide.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

The primary surfactant employed in the present invention is an alkylated hydroxyaromatic sulfonate salt obtained by the alkylation of a phenol or a substituted phenol. Suitable substituents on the phenol include alkyl groups composed of between 1 and 5 carbon atoms, halo- and cyano-groups.

Typically, the phenol or substituted phenol is alkylated with a mixture of normal alpha olefins (NAO's) or isomerized alpha olefins. Preferably, the alkyl chain contains from about 8 to about 40 carbon atoms, more preferred from about 20 to about 24 carbon atoms. Some of the alkyl Chains may be branched. Preferably, 20-50 percent of the alkyl radicals are branched chain radicals.

The alkylated hydroxyaromatic sulfonates of the present invention are preferably derived from an alkylate formed by the reaction of an hydroxyaromatic compound and isomerized alpha olefins in the presence of an acidic alkylation catalyst. In one embodiment, the acidic alkylation catalyst has a Hammett ($H_o$) acidity function of −2.3 or less. In one embodiment, the acidic alkylation catalyst has a Hammett ($H_o$) acidity function of −2.2 or more. Preferably, the acidic alkylation catalyst further has an acid number of about 5.0 milliequivalents per gram and greater.

Suitable acidic alkylation catalysts having a Hammett ($H_o$) acidity function of −2.3 or less are well known in the art and include Nafion® (a fluorocarbonsulfonic acid polymer heterogeneous acid catalyst available from DuPont, Wilmington, Del.), Amberlyst® 36 resin (a sulfonic acid resin available from Rohm & Haas, Philadelphia, Pa.) and the like.

Suitable acidic alkylation catalysts having a Hammett ($H_o$) acidity function of −2.2 or more are well known in the art and include Amberlyst® 15 resin (a sulfonic acid resin available from Rohm & Haas, Philadelphia, Pa.) and the like.

Olefins

The olefins employed to make the surfactant of the present invention may be derived from a variety of sources. Such sources include the normal alpha olefins, linear alpha olefins, isomerized linear alpha olefins, dimerized and oligomerized olefins, and olefins derived from olefin metathesis and branched olefins. Another source from which the olefins may be derived is through cracking of petroleum or Fischer-Tropsch wax. The Fischer-Tropsch wax may be hydrotreated prior to cracking. Other commercial sources include olefins derived from paraffin dehydrogenation and oligomerization of ethylene and other olefins, methanol-to-olefin processes (methanol cracker) and the like.

In one embodiment, the hydroxyaromatic compound may be alkylated with a mixture of normal alpha olefins (NAO's) that have been isomerized and that contain from $C_8$-$C_{40}$ carbon atoms, preferably from $C_{20}$-$C_{24}$ carbon atoms to yield the surfactant alkylate.

Sources of Olefins

The normal alpha olefins employed to make the surfactant in the present invention are commercially available or may be prepared by methods that are well known in the art.

The olefins employed in this invention may be linear, isomerized linear, branched or partially branched. The olefin may be a single carbon number olefin, or it may be a mixture of linear olefins, a mixture of isomerized linear olefins, a mixture of branched olefins, a mixture of partially branched olefins, or a mixture of any of the foregoing.

The olefins may selected from olefins with carbon numbers ranging from about 8 carbon atoms to about 40 carbon atoms.

Preferably, the olefins are selected from olefins with carbon numbers ranging from about 10 to about 30 carbon atoms, more preferred from about 20 to about 24 carbon atoms.

In another embodiment, the olefin or the mixture of olefins is selected from linear alpha olefins or isomerized olefins containing from about 8 to about 40 carbon atoms. More preferably, the mixture of olefins is selected from linear alpha olefins or isomerized olefins containing from about 10 to about 30 carbon atoms. Most preferably, the mixture of olefins is selected from linear alpha olefins or isomerized olefins containing from about 20 to about 24 carbon atoms.

Branched olefins may be selected from polyolefins which may be derived from $C_3$ or higher monoolefins (i.e., propylene oligomers, butylenes oligomers, or co-oligomers etc.). Preferably, the mixture of branched olefins is either propylene oligomers or butylenes oligomers or mixtures thereof.

In one embodiment of the present invention, the normal alpha olefins are isomerized using a solid or liquid acid catalyst. Preferably, the first type of acidic catalyst is a solid catalyst having at least one metal oxide and having an average pore size of less than 5.5 angstroms. More preferably, it is a molecular sieve with a one-dimensional pore system, such as SM-3, MAPO-11, SAPO-11, SSZ-32, ZSM-23, MAPO-39, SAPO-39, ZSM-22 and SSZ-20. Other possible solid acidic catalysts useful for isomerization include ZSM-35, SUZ4, NU-23, NU-87 and natural or synthetic ferrierites. These molecular sieves are well-known in the art and are discussed in Rosemarie Szostak's Handbook of Molecular Sieves (New York, Van Nostrand Reinhold, 1992) and in U.S. Pat. No. 5,282,858, which is hereby incorporated by reference for all purposes. Another type of isomerization catalyst that can be used is iron pentacarbonyl $(Fe(CO)_5)$.

The isomerization process may be carried out in batch or continuous mode. The process temperatures can range from 50° C. to 250. ° C. In the batch mode, a typical method is to use a stirred autoclave or glass flask, which may be heated to the desired reaction temperature. A continuous process is most efficiently carried out in a fixed bed process. Space rates in a fixed bed process can range from 0.1 to 10 or more WHSV. In a fixed bed process, the catalyst is charged to the reactor and activated or dried at a temperature of at least 150° C. under vacuum or flowing inert, dry gas. After activation, the catalyst is cooled to the desired reaction temperature and a flow of the olefin is introduced. The reactor effluent containing the partially branched, isomerized olefin is collected. The resulting partially-branched isomerized olefin contains a different olefin distribution (alpha-olefin, beta-olefin, internal-olefin, trisubstituted olefin and vinylidene-olefin) and branching content than the un-isomerized olefin and conditions are chosen in order to obtain the appropriate structure regarding the level of double bonds between carbon 1 and carbon 2 of the alkyl chain of the olefin (alpha-olefin content).

Alkylation

The hydroxyaromatic compound is reacted with an isomerized alpha olefin, thereby producing an alkylated hydroxyaromatic compound.

In one embodiment, alkylation may occur using a solid acidic alkylation catalyst The alkylation catalyst is a solid catalyst that has at least one metal oxide, which is selected from the group consisting of natural zeolites, synthetic zeolite, synthetic molecular sieves and clays. Preferably, the solid acidic catalyst comprises the acid forms of an acidic clay, or an acidic molecular sieve or a zeolite having an average pore size of at least 6.0 angstroms. Such zeolites include zeolite Y, beta, SSZ-25, SSZ-26 and SSZ-33. Other possible catalysts include L zeolite, mordenite, boggsite, cloverite. VPI-5, MCM-41, MCM-36, SAPO-8, SAPO-5, MAPO-36, SAPO-40, SAPO-41, MAPSO-46, CoAPO-50, hexagonal faujasite, ECM-2, gmelinite, mazzite (omega zeolite), offretite, ZSM-18 and ZSM-12. These catalysts are discussed in Rosemarie Szostak's Handbook of Molecular Sieves (New York, Van Nostrand Reinhold, 1992). More preferably, the solid acidic catalyst comprises zeolite Y. A preferred zeolite Y has a silica to alumina ratio of at least 40:1.

Useful acidic clays may be derived from naturally occurring or synthetic materials. One skilled in the art would realize that there are a number of such clays that are known to be alkylation catalysts. Examples of such acidic clays include montmorillonite, laponite and saponite. Pillared clays may also be used as catalysts.

The solid acidic catalysts may be selected from a group comprising zeolites, acid clays, and/or silica-alumina. An eligible solid catalyst is a cation exchange resin in its acid form, for example crosslinked sulfonic acid catalyst. The catalyst may be a molecular sieve. Eligible molecular sieves are silica-aluminophosphate molecular sieves or metal silica-aluminophosphate molecular sieves, in which the metal may be, for example, iron, cobalt or nickel. Other suitable examples of solid acidic catalysts are disclosed in U.S. Pat. No. 7,183,452, which is herein incorporated by reference.

In one embodiment, the alkylated hydroxyaromatic compound, may also be prepared using a Bronsted acid catalyst or a Lewis acid catalyst.

The Bronsted acid catalyst may be selected from a group comprising hydrochloric acid, hydrofluoric acid, hydrobromic acid, sulfuric acid, perchloric acid, trifluoromethane sulfonic acid, fluorosulfonic acid, and nitric acid and the like. Preferably, the Bronsted acid catalyst is hydrofluoric acid.

The Lewis acid catalyst may be selected from the group of Lewis acids comprising aluminum trichloride, aluminum tribromide, aluminum triiodide, boron trifluoride, boron tribromide, boron triiodide and the like. Preferably, the Lewis acid catalyst is aluminum trichloride.

The Bronsted acid catalyst may be regenerated after it becomes deactivated (i.e., the catalyst has lost all or some portion of its catalytic activity). Methods that are well known in the art may be used to regenerate the acid catalyst, for example, hydrofluoric acid.

The alkylation reaction is typically carried out with an aromatic and an olefin in molar ratios from 1:15 to 25:1. The process temperatures can range from 100° C. to 250° C. As the olefins have a high boiling point, the process is preferably carried out in the liquid phase. The alkylation process may be carried out in batch or continuous mode. In the batch mode, a typical method is to use a stirred autoclave or glass flask which may be heated to the desired reaction temperature. A continuous process is most efficiently carried out in a fixed bed process. Space rates in a fixed bed process can range from 0.1 to 10 or more WHSV. In a fixed bed process, the catalyst is charged to the reactor and activated or dried at a temperature of at least 150° C. under vacuum or flowing inert dry, gas. After activation, the catalyst is cooled to the desired reaction temperature and a flow of the aromatic compound is introduced. Pressure is increased by means of a back pressure valve so that the pressure is above the bubble point pressure of the feed composition at the desired reaction temperature. After pressurizing the system to the desired pressure, the temperature is increased to the desired reaction temperature. Optionally, the aromatic may be added to the catalyst at reaction temperature. A flow of the olefin is then mixed with the aromatic and allowed to flow over the catalyst. The reactor effluent containing alkylate product and excess aromatic is collected. Excess aromatic is then removed by distillation, stripping evaporation under vacuum or other means know to those skilled in the art.

Preparation of the Alkylated Hydroxyaromatic Sulfonate

The alkylated hydroxyaromatic product prepared by the process described herein is further reacted to form an alkylated hydroxy aromatic sulfonic acid and then the corresponding sulfonate.

Sulfonation

Sulfonation of the alkylated hydroxy aromatic compound may be performed by any method known to one of ordinary skill in the art. The sulfonation reaction is typically carried out in a continuous falling film tubular reactor maintained at about 45° C. to about 125° C. The alkylated hydroxy aromatic compound is placed in the reactor along with sulfur trioxide diluted with air thereby producing an alkylated hydroxyaromatic sulfonic acid. Other sulfonation reagents, such as sulfuric acid, chlorosulfonic acid or sulfamic acid may also be employed. Preferably, the alkylated hydroxyaromatic compound is sulfonated with sulfur trioxide diluted with air. The charge mole ratio of sulfur trioxide to alkylate is maintained at about 0.8 to 1.1:1.

Neutralization of Alkylated Hydroxyaromatic Sulfonic Acid

Neutralization of the alkylated hydroxyaromatic sulfonic acid may be carried out in a continuous or batch process by any method known to a person skilled in the art to produce alkylated hydroxyaromatic sulfonates. Typically, an alkylated hydroxyaromatic sulfonic acid is neutralized with a source of alkali, ammonium, or substituted ammonium thereby producing an alkylated hydroxyaromatic sulfonate. Preferably, the source of alkali is an alkali earth metal; more preferably, the source is an alkali metal hydroxide, such as but not limited to, sodium hydroxide or potassium hydroxide.

The Co-Surfactant

Optionally, the enhanced oil recovery composition of the present invention may also contain a co-surfactant.

The co-surfactant is at least one of an isomerized alpha olefin sulfonate, an alkaryl sulfonate, or mixtures thereof.

Isomerized Alpha Olefin Sulfonates

Suitable examples of isomerized alpha olefin sulfonates typically have a general formula of:

wherein $R_2$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation. In one embodiment, X is an alkali metal, ammonium or substituted ammonium.

Preferably, the alkali metal is an alkali earth metal; more preferably, the alkali metal is an alkali metal hydroxide, such as but not limited to, sodium hydroxide or potassium hydroxide.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

The secondary co-surfactant employed in the present invention is an isomerized olefin sulfonate (IOS) made by the sulfonation of an isomerized alpha olefin (IAO) in which the IAO is made by the isomerization of $C_{12}$-$C_{40}$ normal alpha olefins (NAO), preferably $C_{20}$-$C_{28}$ normal alpha olefins, most preferred $C_{20}$-$C_{24}$ normal alpha olefins.

In one embodiment, $R_4$ is derived from a partially isomerized alpha olefin containing a residual alpha olefin content.

The IAO comprises from about 12 to about 40 carbon atoms, more preferred from about 20 to about 28 carbon atoms and most preferred from about 20 to about 24 carbon atoms.

The IAO is composed of between from about 20 to about 98 wt % branching, preferably from about 45 to about 80 wt % branching and most preferred from about 60 to about 70 wt % branching and between from about 0.1 to about 30 wt % residual alpha olefin, preferably between from about 0.2 to about 20 wt % residual alpha olefin and most preferably between from about 0.5 to about 10 wt % residual alpha olefin species.

In one embodiment, the IAO is composed of at least about 23% branching, at least about 9% residual alpha olefin, and having from about 20 to about 24 carbon atoms. In another embodiment, the IAO is composed of at least about 65% branching, at least about 0.2-0.5% residual alpha olefin and having from about 20 to about 24 carbon atoms.

In one embodiment, when the percent branching in the partially isomerized alpha olefin is less than or equal to 25 weight percent, then the residual alpha olefin content in such partially isomerized alpha olefin is greater than or equal to 8 weight percent.

In one embodiment, when the percent branching in the partially isomerized alpha olefin is greater than or equal to 15 weight percent, then the residual alpha olefin content in such partially isomerized alpha olefin is less than or equal to 15 weight percent and when the percent branching in the partially isomerized alpha olefin is less than or equal to 15 weight percent, then the residual alpha olefin content in such partially isomerized alpha olefin is greater than or equal to 15 weight percent.

Typically, the normal alpha olefins are isomerized as described hereinabove.

Sulfonation

Sulfonation of the IAO may be performed by any method known to one of ordinary skill in the art to produce an IAO sulfonic acid intermediate. The sulfonation reaction is typically carried out in a continuous falling film tubular reactor maintained at about 30° C. to about 75° C. The charge mole ratio of sulfur trioxide to olefin is maintained at about 0.3 to 1.1:1.

Other sulfonation reagents, such as sulfuric acid, chlorosulfonic acid or sulfamic acid may also be employed. Preferably, the isomerized alpha olefin is sulfonated with sulfur trioxide diluted with air.

The product from the sulfonation process may then be thermally digested by heating.

Neutralization of the Isomerized Alpha Olefin Sulfonic Acid

Neutralization of the IAO sulfonic acid may be carried out in a continuous or batch process by any method known to a person skilled in the art to produce the IOS. Typically, an IAO sulfonic acid is neutralized with a source of alkali metal, ammonium, or substituted ammonium. Preferably, the source is an alkali metal base; more preferably, the source is an alkali metal hydroxide, such as but not limited to, sodium hydroxide or potassium hydroxide.

As noted above, sulfonation of the IAO may be followed by thermal digestion and the resulting product is then neutralized with caustic, and optionally followed by hydrolysis with caustic. The resulting sodium isomerized olefin sulfonate (IOS) is composed of between from about 1 to about 70 wt % alcohol sodium sulfonate. In one embodiment, IOS is composed of between from about 5 to about 35 wt % alcohol sodium sulfonate species with the remainder of the sodium sulfonate species being the sodium olefin sulfonate species. In another embodiment the IOS is composed of between from about 35 to about 60 wt % alcohol sodium sulfonate species with the remainder of the sodium sulfonate species being the sodium olefin sulfonate species.

In one embodiment, the neutralized isomerized alpha olefin sulfonate is further hydrolyzed with caustic.

With regard to M in the primary surfactant and X in the co-surfactant, M and X are independently mono-valent cations, and preferably are independently selected from alkali metal, ammonium and substituted ammonium.

Alkylaryl Sulfonates

In one embodiment, alkylaryl sulfonates may be employed as the optional co-surfactant alone or together with the other optional co-surfactant, the isomerized alpha olefin sulfonate.

Suitable examples of alkaryl sulfonates are $C_{12}$ to $C_{40}$ linear, branched or partially branched alkyl moieties on an aromatic ring where the aromatic constituent may be benzene, toluene or xylene.

Typically, the alkylaryl sulfonates have the general formula:

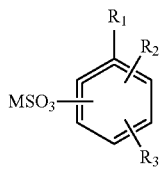

wherein $R_1$ is hydrogen or an alkyl group containing from about 1 to 3 carbon atoms; $R_2$ is hydrogen or an alkyl group having from about 1 to 3 carbon atoms; $R_3$ is an alkyl group having from about 8 to about 60 carbon atoms, and M is a mono-valent cation. In one embodiment, M is an alkali metal, ammonium, or substituted ammonium.

Preferably, the alkali metal is an alkali earth metal; more preferably, the alkali metal is an alkali metal hydroxide, such as but not limited to, sodium hydroxide or potassium hydroxide.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

In one embodiment, $R_1$ and $R_2$ are methyl and the alkylaromatic moiety is alkylxylene. More preferably, the alkylxylene moiety is alkyl-ortho-xylene.

In another embodiment the alkylaromatic moiety is alkyl-meta-xylene.

The alkylaryl sulfonate employed in the present invention is an alkylaromatic sulfonate salt obtained by the alkylation of an aromatic compound. Preferably, the aromatic compound is benzene, toluene, xylene, mixtures thereof or the like. More preferred, aromatic compound is toluene, xylene, or mixtures thereof. If xylene is employed, the xylene compound may comprise ortho-, meta-, or para-xylene, or mixtures thereof.

Typically, the aromatic compound is alkylated with a mixture of normal alpha olefins (NAO's) containing from $C_8$-$C_{60}$ carbon atoms, preferably $C_{10}$-$C_{50}$ carbon atoms, and most preferred from $C_{12}$-$C_{40}$ carbon atoms to yield an aromatic alkylate. The alkylate is sulfonated to form an alkylaromatic sulfonic acid which is then neutralized with caustic thereby producing a sodium alkylaromatic sulfonate compound. The most preferred alkylate is made by the alkylation of ortho-xylene which produces an alkylate containing several isomers, but in which at least 90 wt. % of the alkylate is the 1, 3, 4-ring attachment structure, having 40 to 60 wt % 2-alkyl attachment to the aromatic ring (i.e., wherein the longest alkyl chain is attached to the aromatic ring at the 2-position on the alkyl chain), preferably 45-55 wt % 2-alkyl attachment and more preferred about 50 wt % 2-alkyl attachment to the aromatic ring. Preferably, the alkylate will contain from 1 to 20 wt % dialkylate species and more preferably less than 10 wt % dialkylate species. Preferably, at least about 95 wt % and most preferred 98 wt % of the alkylate contains the 1, 3, 4-ring attachment structure. Upon sulfonation of the alkylate, a mixture of alkylaromatic sulfonic acid isomers are formed and the preferred isomer is the 2-alkyl-4,5-dimethyl benzene sulfonic acid isomer where the amount of this sulfonic acid isomer is present, preferably, in an amount of from about 1 to about 90 wt %, more preferably in an amount of from about 10 to about 80 wt % and most preferably in amount of at least about 70 wt %.

Aromatic Compound

At least one aromatic compound or a mixture of aromatic compounds may be used for the alkylation reaction in the present invention. Preferably the at least one aromatic compound or the aromatic compound mixture comprises at least one of monocyclic aromatics, such as benzene, toluene, xylene, cumene or mixtures thereof. More preferably, the at least one aromatic compound or aromatic compound mixture is xylene, including all isomers (i.e., meta-, ortho- and para-), and mixtures thereof. Most preferably, the at least one aromatic compound is ortho-xylene.

Sources of Aromatic Compound

The at least one aromatic compound or the mixture of aromatic compounds employed in the present invention is commercially available or may be prepared by methods that are well known in the art.

Olefins

The olefins employed to make the primary surfactant of the present invention may be derived from a variety of sources. Such sources include the normal alpha olefins, linear alpha olefins, isomerized linear alpha olefins, dimerized and oligomerized olefins, and olefins derived from olefin metathesis. Another source from which the olefins may be derived is through cracking of petroleum or Fischer-Tropsch wax. The Fischer-Tropsch wax may be hydrotreated prior to cracking. Other commercial sources include olefins derived from paraffin dehydrogenation and oligomerization of ethylene and other olefins, methanol-to-olefin processes (methanol cracker) and the like.

In one embodiment, the aromatic compound may be alkylated with a mixture of normal alpha olefins (NAO's) containing from $C_8$-$C_{60}$ carbon atoms, preferably from $C_{10}$-$C_{50}$ carbon atoms and more preferred from $C_{12}$-$C_{40}$ carbon atoms to yield the primary surfactant alkylate.

Sources of Olefins

The normal alpha olefins employed to make the primary surfactant in the present invention are commercially available or may be prepared by methods that are well known in the art.

The olefins employed in this invention may be linear, isomerized linear, branched or partially branched. The olefin may be a single carbon number olefin, or it may be a mixture of linear olefins, a mixture of isomerized linear olefins, a mixture of branched olefins, a mixture of partially branched olefins, or a mixture of any of the foregoing.

The olefins may selected from olefins with carbon numbers ranging from about 8 carbon atoms to about 60 carbon atoms. Preferably, the olefins are selected from olefins with carbon numbers ranging from about 10 to about 50 carbon atoms, more preferred from about 12 to about 40 carbon atoms.

In another embodiment, the olefin or the mixture of olefins is selected from linear alpha olefins or isomerized olefins containing from about 8 to about 60 carbon atoms. More preferably, the mixture of olefins is selected from linear alpha olefins or isomerized olefins containing from about 10 to about 50 carbon atoms. Most preferably, the mixture of olefins is selected from linear alpha olefins or isomerized olefins containing from about 12 to about 40 carbon atoms.

The mixture of branched olefins is preferably selected from polyolefins which may be derived from $C_3$ or higher monoolefins (i.e., propylene oligomers, butylenes oligomers, or co-oligomers etc.). Preferably, the mixture of branched olefins is either propylene oligomers or butylenes oligomers or mixtures thereof.

Preferably, the linear olefins that may be used for the alkylation reaction may be one or a mixture of normal alpha olefins selected from olefins having from about 8 to about 60 carbon atoms per molecule. More preferably, the normal alpha olefin is selected from olefins having from about 10 to about 50 carbon atoms per molecule. Most preferably, the normal alpha olefin is selected from olefins having from about 12 to about 40 carbon atoms per molecule.

In one embodiment of the present invention, the normal alpha olefins are isomerized using a solid or a liquid acid catalyst. A solid catalyst preferably has at least one metal oxide and an average pore size of less than 5.5 angstroms. More preferably, the solid catalyst is a molecular sieve with a one-dimensional pore system, such as SM-3, MAPO-11, SAPO-11, SSZ-32, ZSM-23, MAPO-39, SAPO-39, ZSM-22 or SSZ-20. Other possible acidic solid catalysts useful for isomerization include ZSM-35, SUZ-4, NU-23, NU-87 and natural or synthetic ferrierites. These molecular sieves are well known in the art and are discussed in Rosemarie Szostak's Handbook of Molecular Sieves (New York, Van Nostrand Reinhold, 1992) which is herein incorporated by reference for all purposes. A liquid type of isomerization catalyst that can be used is iron pentacarbonyl ($Fe(CO)_5$).

The process for isomerization of normal alpha olefins may be carried out in batch or continuous mode. The process temperatures may range from about 50° C. to about 250° C. In the batch mode, a typical method used is a stirred autoclave or glass flask, which may be heated to the desired reaction temperature. A continuous process is most efficiently carried out in a fixed bed process. Space rates in a fixed bed process can range from 0.1 to 10 or more weight hourly space velocity.

In a fixed bed process, the isomerization catalyst is charged to the reactor and activated or dried at a temperature of at least 125° C. under vacuum or flowing inert, dry gas. After activation, the temperature of the isomerization catalyst is adjusted to the desired reaction temperature and a flow of the olefin is introduced into the reactor. The reactor effluent containing the partially-branched, isomerized olefins is collected. The resulting partially-branched, isomerized olefins contain a different olefin distribution (i.e., alpha olefin, beta olefin; internal olefin, tri-substituted olefin, and vinylidene olefin) and branching content than that of the unisomerized olefin and conditions are selected in order to obtain the desired olefin distribution and the degree of branching.

Acid Catalyst

Typically, the alkylated aromatic compound may be prepared using a Bronsted acid catalyst, a Lewis acid catalyst, or solid acidic catalysts.

The Bronsted acid catalyst may be selected from a group comprising hydrochloric acid, hydrofluoric acid, hydrobromic acid, sulfuric acid, perchloric acid, trifluoromethane sulfonic acid, fluorosulfonic acid, and nitric acid and the like. Preferably, the Bronsted acid catalyst is hydrofluoric acid.

The Lewis acid catalyst may be selected from the group of Lewis acids comprising aluminum trichloride, aluminum tribromide, aluminum triiodide, boron trifluoride, boron tribromide, boron triiodide and the like. Preferably, the Lewis acid catalyst is aluminum trichloride.

The solid acidic catalysts may be selected from a group comprising zeolites, acid clays, and/or silica-alumina. An eligible solid catalyst is a cation exchange resin in its acid form, for example crosslinked sulfonic acid catalyst. The catalyst may be a molecular sieve. Eligible molecular sieves are silica-aluminophosphate molecular sieves or metal silica-aluminophosphate molecular sieves, in which the metal may be, for example, iron, cobalt or nickel. Other suitable examples of solid acidic catalysts are disclosed in U.S. Pat. No. 7,183,452, which is herein incorporated by reference.

The Bronsted acid catalyst may be regenerated after it becomes deactivated (i.e., the catalyst has lost all or some portion of its catalytic activity). Methods that are well known in the art may be used to regenerate the acid catalyst, for example, hydrofluoric acid.

Process for Preparing the Alkylated Aromatic Compound

The alkylation technologies used to produce the primary surfactant alkylate will include Bronsted and/or Lewis acids as well as solid acid catalysts utilized in a batch, semi-batch or continuous process operating at between from about 0 to about 300 degrees Celsius.

The acid catalyst may be recycled when used in a continuous process. The acid catalyst may be recycled or regenerated when used in a batch process or a continuous process.

In one embodiment of the present invention, the alkylation process is carried out by reacting a first amount of at least one aromatic compound or a mixture of aromatic compounds with a first amount of a mixture of olefin compounds in the presence of a Bronsted acid catalyst, such as hydrofluoric acid, in a first reactor in which agitation is maintained, thereby producing a first reaction mixture. The resulting first reaction mixture is held in a first alkylation zone under alkylation conditions for a time sufficient to convert the olefin to aromatic alkylate (i.e., a first reaction product). After a desired time, the first reaction product removed from the alkylation zone and fed to a second reactor wherein the first reaction product is reacted with an additional amount of at least one aromatic compound or a mixture of aromatic compounds and an additional amount of acid catalyst and, optionally, with an additional amount of a mixture of olefin compounds wherein agitation is maintained. A second reaction mixture results and is held in a second alkylation zone under alkylation conditions for a time sufficient to convert the olefin to aromatic alkylate (i.e., a second reaction product). The second reaction product is fed to a liquid-liquid separator to allow hydrocarbon (i.e., organic) products to separate from the acid catalyst. The acid catalyst may be recycled to the reactor(s) in a closed loop cycle. The hydrocarbon product is further treated to remove excess un-reacted aromatic compounds and, optionally, olefinic compounds from the desired alkylate product. The excess aromatic compounds may also be recycled to the reactor(s).

In another embodiment of the present invention, the reaction takes place in more than two reactors which are located in series. Instead of feeding the second reaction product to a liquid-liquid separator, the second reaction product is fed to a third reactor wherein the second reaction product is reacted with an additional amount of at least one aromatic compound or a mixture of aromatic compounds and an additional amount of acid catalyst and, optionally, with an additional amount of a mixture of olefin compounds wherein agitation is maintained. A third reaction mixture results and is held in a third alkylation zone under alkylation conditions for a time sufficient to convert the olefin to aromatic alkylate (i.e., a third reaction product). The reactions take place in as many reactors as necessary to obtain the desired alkylated aromatic reaction product.

The total charge mole ratio of Bronsted acid catalyst to the olefin compounds is about 1.0 to 1 for the combined reactors. Preferably, the charge mole ratio of Bronsted acid catalyst to the olefin compounds is no more than about 0.7 to 1 in the first reactor and no less than about 0.3 to 1 in the second reactor.

The total charge mole ratio of the aromatic compound to the olefin compounds is about 7.5 to 1 for the combined reactors. Preferably, the charge mole ratio of the aromatic compound to the olefin compounds is no less than about 1.4 to 1 in the first reactor and is no more than about 6.1 to 1 in the second reactor.

Many types of reactor configurations may be used for the reactor zone. These include, but are not limited to, batch and continuous stirred tank reactors, reactor riser configurations, ebulating bed reactors, and other reactor configurations that are well known in the art. Many such reactors are known to those skilled in the art and are suitable for the alkylation reaction. Agitation is critical for the alkylation reaction and can be provided by rotating impellers, with or without baffles, static mixers, kinetic mixing in risers, or any other agitation devices that are well known in the art. The alkylation process may be carried out at temperatures from about 0° C. to about 100° C. The process is carried out under sufficient pressure that a substantial portion of the feed components remain in the liquid phase. Typically, a pressure of 0 to 150 psig is satisfactory to maintain feed and products in the liquid phase.

The residence time in the reactor is a time that is sufficient to convert a substantial portion of the olefin to alkylate product. The time required is from about 30 seconds to about 30 minutes. A more precise residence time may be determined by those skilled in the art using batch stirred tank reactors to measure the kinetics of the alkylation process.

The at least one aromatic compound or mixture of aromatic compounds and the olefin compounds may be injected separately into the reaction zone or may be mixed prior to injection. Both single and multiple reaction zones may be used with the injection of the aromatic compounds and the olefin compounds into one, several, or all reaction zones. The reaction zones need not be maintained at the same process conditions. The hydrocarbon feed for the alkylation process may comprise a mixture of aromatic compounds and olefin compounds in which the molar ratio of aromatic compounds to olefins is from about 0.5:1 to about 50:1 or more. In the case where the molar ratio of aromatic compounds to olefin is >1.0 to 1, there is an excess amount of aromatic compounds present. Preferably an excess of aromatic compounds is used to increase reaction rate and improve product selectivity. When excess aromatic, compounds are used, the excess un-reacted aromatic in the reactor effluent can be separated, e.g. by distillation, and recycled to the reactor.

Preparation of Alkylaryl Sulfonate

The alkylaromatic product prepared by the process described herein is further reacted to form an alkylaromatic sulfonic acid and then the corresponding sulfonate.

Sulfonation

Sulfonation of the alkylaromatic compound may be performed by any method known to one of ordinary skill in the art. The sulfonation reaction is typically carried out in a continuous falling film tubular reactor maintained at about 45° C. to about 75° C. The alkylaromatic compound is placed in the reactor along with sulfur trioxide diluted with air thereby producing an alkylaryl sulfonic acid. Other sulfonation reagents, such as sulfuric acid, chlorosulfonic acid or sulfamic acid may also be employed. Preferably, the alkylaromatic compound is sulfonated with sulfur trioxide diluted with air. The charge mole ratio of sulfur trioxide to alkylate is maintained at about 0.8 to 1.1:1.

Neutralization of Alkylaromatic Sulfonic Acid

Neutralization of the alkylaryl sulfonic acid may be carried out in a continuous or batch process by any method known to a person skilled in the art to produce alkylaryl sulfonates. Typically, an alkylaryl sulfonic acid is neutralized with a source of alkali or alkaline earth metal or ammonia, thereby producing an alkylaryl sulfonate. Preferably, the source is an alkali metal base; more preferably, the source is an alkali metal hydroxide, such as but not limited to, sodium hydroxide or potassium hydroxide.

The Solvent

Suitable solvents employed in the present invention are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycols ethers or any other common organic solvent or combinations of any two or more solvents. In one embodiment, the solvent is n-butyl mono ether of ethylene glycol (EGBE).

The Passivator

Typically, the passivator employed in the present invention is an alkali metal salt. Preferably, the alkali metal salt is a base, such as an alkali metal hydroxide, carbonate or bicarbonate, including, but not limited to, sodium carbonate, sodium bicarbonate, sodium hydroxide, potassium hydroxide, lithium hydroxide and the like.

The Polymer

Polymers, such as those commonly employed for enhanced oil recovery, may be included to control the mobility of the injection solution. Such polymers include, but are not limited to, xanthan gum; polyacrylamide (PAM); partially hydrolyzed polyacrylamides (HPAM); and copolymers of 2-acrylamido-2-methylpropane sulfonic acid or sodium salt or mixtures thereof and polyacrylamide (PAM) commonly referred to as AMPS copolymer and mixtures of the copolymers thereof. The polymers may be used alone in the enhanced oil recovery composition or in conjunction with other polymers. Molecular weights ($M_w$) of the polymers range from about 10,000 daltons to about 20,000,000 daltons. Polymers are used in the range of about 500 to about 5000 ppm concentration, preferably from about 1000 to 2000 ppm in order to match or exceed the reservoir oil viscosity under the reservoir conditions of temperature and pressure.

Enhanced Oil Recovery Surfactant Composition

The enhanced oil recovery surfactant composition used in the recovery of oil in reservoirs, by the use of surfactant flooding techniques, comprises a primary surfactant, optionally a co-surfactant, a solvent, a passivator and a polymer in an aqueous solution.

Preferably, the composition of the enhanced oil recovery surfactant comprises from about 0.5 to about 4.0 weight percent actives of the primary surfactant, from about 0.1 to 3.0 weight percent actives of the optional co-surfactant, from about 0.5 to about 6.0 weight percent of the solvent, from about 0.3 to about 2.5 weight percent of the passivator and from about 200 to 5000 ppm of the polymer, all of which are in an aqueous solution containing from about 500 to about 10,000 ppm total dissolved solids.

More preferred, the composition of the enhanced oil recovery surfactant comprises from about 1.0 to about 3.0 wt % actives of the primary surfactant, from about 0.3 to about 2.0 wt % actives of the co-surfactant, from about 1.0 to about 4.0 wt % of the solvent, from about 0.5 to about 1.5 wt % of the passivator and from about 1000 to about 3000 ppm of the polymer, all of which are in an aqueous solution containing from about 1000 to about 10,000 ppm total dissolved solids.

Process of Making the Enhanced Oil Recovery Surfactant Formulation

The enhanced oil recovery surfactant formulation of the present invention is prepared by a process of mixing (a) a surfactant comprising an alkylated hydroxy aromatic sulfonate having the general formula

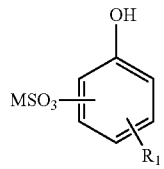

wherein $R_1$ is an alkyl group containing from about 8 to 40 carbon atoms and having from about 20% to about 50% methyl branching, and M is a mono-valent cation; (b) a solvent; (c) a passivator; and (d) a polymer.

In another embodiment, a co-surfactant is mixed with the other components. The co-surfactant may be an isomerized alpha olefin sulfonate, alkylaryl sulfonate or mixtures thereof.

The present invention is also directed to a method of recovering crude oil from a subterranean hydrocarbon-containing formation which comprises (i) injecting into said formation an enhanced oil recovery composition comprising (a) an alkylated hydroxyaromatic sulfonate having the general formula:

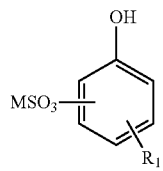

wherein $R_1$ is an alkyl group containing from about 8 to 40 carbon atoms and having from about 20% to about 50% methyl branching, and M is a mono-valent cation; (b) a solvent; (c) a passivator; and (d) a polymer, and (ii) recovering the crude oil from one or more production wells.

Other embodiments will be obvious to those skilled in the art.

The following examples are presented to illustrate specific embodiments of this invention and are not to be construed in any way as limiting the scope of the invention.

EXAMPLE 1

Preparation of 41.4% Branched $C_{20-24}$ Isomerized Normal Alpha Olefins (NAO)

The normal alpha olefins were received from ChevronPhillips Chemical Company, Woodlands, Tex. and found to have the following properties: 41.4% Methyl Branching

EXAMPLE 2

Measurement of % Methyl Branching and % Alpha-Olefin in $C_{20-24}$ Isomerized NAO Infrared spectrometry is used to determine the percentage methyl branching and percentage residual alpha-olefin of isomerized $C_{20-24}$ NAO or isomerized alpha olefin (IAO). The technique involves developing a calibration curve between the infrared absorption at 1378 cm-1 (characteristic of the methyl stretch) measured by attenuated reflectance (ATR) infrared spectrometry and the percent branching determined by GLPC analysis of the corresponding hydrogenated IAO samples (hydrogenation converts the IAO to a mixture of paraffins in which the normal paraffin has the longest retention time for a give carbon number). Similarly, a calibration curve was developed between the infrared absorption at 907 cm-1 (characteristic of alpha olefin C—H stretch) determined by attenuated reflectance (ATR) infrared spectrometry and the percent alpha-olefin determined by quantitative carbon NMR. A linear least squares fit of data for the percent branching showed the following equation:

% Branching by Hydrogenation GC=3.0658 (Peak Height at 1378 cm-1, in mm, by ATR Infrared Spectroscopy)−54.679. The R2 was 0.9321 and the branching content of the samples used to generate this calibration equation ranged from approximately 9% to 92%.

Similarly, a linear least squares fit of the percent alpha-olefin data showed the following equation: % Alpha-Olefin by Carbon NMR=0.5082 (Peak Height at 909 cm-1, in mm, by ATR Infrared Spectroscopy)−2.371. The R2 was 0.9884 and the alpha-olefin content of the samples used to generate this calibration equation ranged from approximately 1% to 75%.

EXAMPLE 3

Preparation of 41.5% Branched $C_{20-24}$ Alkylphenol

To a 10 liter, glass, four-neck flask fitted with a mechanical stirrer, reflux condenser and thermocouple under a dry nitrogen atmosphere was charged 2210 grams of melted phenol (23.5 moles) followed by 1450 grams (4.71 moles) of the isomerized $C_{20-24}$ alpha-olefin from Example 1 containing 41.4% Branching. To this gently stirring mixture was added 290 grams of Amberlyst 36® acidic ion exchange resin obtained from Rohm and Haas, Philadelphia, Pa. (dried approximately 25 hours in an oven at 110° C.). The reaction temperature was increased to 120° C. and held for about 90 hours at which time the conversion was 42% (by Supercritical Fluid Chromatography). Additional Amberlyst 36® catalyst was added to the following total reaction times when conversion was not complete: 100 grams at 90 hours; 60 grams at 116 hours and 50 grams at 123 hours for a total catalyst charge of 500 grams. After 145 hours of reaction time, the conversion was 99.5% and the reaction product was cooled to approximately 70° C. and filtered through a Buchner funnel with the aid of vacuum and the filtrate combined with that of previous repeat reactions to afford approximately 1.30 kg of product. This product was vacuum distilled (114° C. at 50 Torr vacuum, then 208-215° C. at 30-35 Ton vacuum and then finally 247-195° C. at 10-12 Ton vacuum to afford 7038 grams of the alkylphenol 5610 with the following properties: 0.54% un-reacted olefin/paraffin, 9.3% di-alkylate as determined by Supercritical Fluid Chromatography; 55% para-alkyl isomer as determined by Infra Red.

EXAMPLE 4

Preparation of 41.5% Branched $C_{20-24}$ Hydroxy Sulfonic Acid

The 41.5% Branched $C_{20-24}$ Alkylphenol of Example 3 was sulfonated in a concurrent stream of sulfur trioxide ($SO_3$) and air in a tubular reactor (approximately, 2 meters long, 1 cm inside diameter) in a down flow mode using the following conditions:

| Reactor Tempearature: | 60° C. |
| Alkylate Feed Temperature: | 50° C. |
| Air Flow: | 192 L/hr |
| $SO_2$ Flow: | 16 L/hr |
| Alkylate Feed Flow: | 4.09 grams/min |
| Charge Molar Ratio $SO_3$/Alkylate | 0.98 |

The $SO_3$ was generated by passing the mixture of oxygen and sulfur dioxide ($SO_2$) through a catalytic furnace containing vanadium oxide ($V_2O_5$). Under these conditions, the crude 41.5% Branched $C_{20-24}$ Alkylphenol Hydroxy Sulfonic Acid produced was digested at approximately 70° C. for 20 minutes and the resulting hydroxyl sulfonic acid had the following properties: 14.78 wt. % $SO_3H$ and 0.6 wt % $H_2SO_4$.

EXAMPLE 5

Neutralization of 41.5% Branched $C_{20-24}$ HydroxySulfonic Acid—Preparation of Sodium Hydroxy Sulfonate The 41.5% Branched $C_{20-24}$ hydroxy sulfonic acid of Example 4 (288 grams) was placed into a 500 ml glass beaker fitted with a mechanical stirrer and heated to approximately 70° C. A total of 48.31 grams of 50% aqueous sodium hydroxide solution was added in portions (approximately 1 to 17 grams each) over 90 minutes while the temperature increased to a maximum of 89° C. The final product had the following properties: pH=9.6 (as 1.0 wt. % aqueous solution), Actives=57.6% (Hyamine titration).

EXAMPLE 6

Preparation of Al 2000 A: $C_{12-30+}$ NAO Alkyl-o-Xylene

Al 2000A (alkylated ortho-xylene) was prepared by the catalytic alkylation of o-xylene with a $C_{12-30+}$ blend of NAO's by a third party. The NAO blend was purchased from Chevron Phillips Chemical Company and had the following composition:

| Total $C_{10}$ or less | WT % | 0.01 |
| Total $C_{12}$ | WT % | 3.92 |
| Total $C_{14}$ | WT % | 23.28 |
| Total $C_{16}$ | WT % | 18.12 |
| Total $C_{18}$ | WT % | 13.74 |
| Total $C_{20}$ | WT % | 8.88 |
| Total $C_{22}$ | WT % | 7.49 |
| Total $C_{24}$ | WT % | 5.97 |
| Total $C_{26}$ | WT % | 3.23 |
| Total $C_{28}$ | WT % | 3.50 |
| Total $C_{30+}$ | WT % | 11.86 |

The properties of the resulting AL 2000A obtained were as follows: Bromine Index=358 mg Br2/gram of sample; Karl Fisher Water=148 ppm; 1,2,3 Ring Isomer Content=2.2%; Viscosity (100° C.)=4.5 cSt; MW=355.

EXAMPLE 7

Preparation of Sodium Sulfonate of Al 2000A

SACS 2000A was prepared by the sulfonation of the AL 2000A from Example 6 using SO3/Air in a 0.6 inch diameter tubular film reactor. Just after the bottom of the film reactor the freshly made—hot sulfonic acid was mixed with a large portion of cooled—recycled sulfonic acid. The portion of sulfonic acid not recycled back to the bottom of the reactor was metered though a digestion system consisting of a heat exchanger followed by plug flow digester(s), followed by a variable level digester. The digested sulfonic acid was metered to the neutralizer where it was neutralized with 50% sodium hydroxide. The digested sulfonic acid and aqueous sodium hydroxide were metered into the suction of a high shear mixer. The mixer was followed by a vane pump used to recycle a large portion of the neutralized product back to the inlet of the mixer; the remainder was discharged to sample containers. The process conditions were as follows:
CMR $SO_3$/Al 2000A=0.98
$SO_3$ in Air Concentration=5.9 wt. %
Sp3 Loading=1.35 kg/hr-cm
Reactor Temperature=65° C.
Feed Temperature=60° C.
Neutralization Temperature=65° C.
Digestion Temperature=65° C.
Digestion Time 30 minutes
Neutralization Temperature=75° C.
The intermediate acid produced prior to neutralization had the following properties: 92.8% RSO3H and 0.79% H2SO4. The resulting sulfonate had the following properties: 82.7% actives, pH=9.6 (1 wt. % aqueous solution)

EXAMPLE 8

Phase Behavior and Core Flood Testing

The Hydroxy Sulfonate of Example 5 was tested alone and in combination with the sulfonate prepared in Example 7 for phase behavior (added sodium carbonate scan from 0 to 20,000 ppm in Synthetic Minas Brine—SSMB) and core flood performance as described by Jackson (Jackson, A. C. "Experimental Study of the Benefits of Sodium Carbonate on Surfactants for Enhanced Oil Recovery." MSE Thesis, University of Texas at Austin, December 2006) using crude oil from the Minas reservoir in Sumatra, Indonesia:

The co-solvent used in the formulations was ethylene glycol mono-butyl ether (EGBE).

The oil solubilization parameter (SP) and Optimal Salinity (S*) for different formulations are tabulated in Table I.

TABLE I

Phase Behavior Performance

| Experiment | Surfactant 1 | Wt. % | Surfactant 2 | Wt. % | Wt. % EGBE | SP | S* (Wt. %) |
|---|---|---|---|---|---|---|---|
| 1 | Example 5 | 2.00 | | | 2.00 | 11 | 1.8 |
| 2 | Example 5 | 1.00 | | | 1.00 | | Type I |
| 3 | Example 5 | 2.00 | | | 2.00 | 12 | 1.7 |
| 5 | Example 5 | 2.00 | | | 2.50 | 8 | 2.0 |
| 6 | Example 5 | 2.00 | | | 3.00 | 8 | 2.0 |
| 7 | Example 5 | 0.5 | Example 7 | 1.5 | 3.00 | 7 | 1.0 |
| 8 | Example 5 | 0.5 | Example 7 | 1.5 | 2.00 | 7 | 0.9 |

The formulation of Experiment 8 in Table I containing 2600 ppm polymer (1.5% Example 7 surfactant (CS2P), 0.5% Example 5 surfactant (HDXL), 2.5% EGBE, 0.8% $Na_2CO_3$, 2600 ppm AN125 in SSMB) followed with a polymer drive (1900 ppm AN125 in SSMB) was core flood tested using a BriarHill core. The properties of the BriarHill stone are summarized in Table II.

TABLE II

BM-12 BriarHill Core Properties and Permeability Data

| BM-12 | core #C3878-42 | units |
|---|---|---|
| Length | 30.48 | cm |
| Width | 5.08 | cm |
| Height | 5.08 | cm |
| Bulk Volume | 786.6 | cc |
| Rock wt. | 1615.00 | g |
| Dry wt | 3999.02 | g |
| Sat wt | 4143.81 | g |
| PV | 144.79 | cc |
| μ (cp) | 0.9 | |
| π | 0.184 | |
| Temp = 185° F. | | |

| ΔP (psi) | q (cc/min) | k (mD) |
|---|---|---|
| 0.10 | 0.5 | 1284.8 |
| 0.21 | 1.0 | 1223.6 |
| 0.42 | 2.0 | 1223.6 |
| 0.6 | 3.0 | 1223.6 |
| Average permeability: | | 1238.9 |

The oil flood was run at constant rate of 1.0 ml/min at 185° F. through the core and the pressure was recorded. Minas crude oil was used to saturate the core. The crude was filtered through a 20 micron filter at reservoir temperature prior to injection. The end saturation of oil was 61.2% leaving 88.60 ml oil in the core as listed in Table III.

TABLE III

BM-12 Oil Flood Data

| Total Water displaced | 88.60 cc |
|---|---|
| PV | 144.79 cc |
| Oil in Core | 88.60 cc |
| Saturation of Oil (soi) | 61.2% |

TABLE III-continued

BM-12 Oil Flood Data

Oil Permeability endpoint (ko)

| ΔP (psi) | q (cc/min) | k (mD) |
|---|---|---|
| 1.0 | 1.0 | 970.7 |

Oil relative permeability endpoint ($k_{ro}°$)

| $k_{ro}$ = | 0.784 |
|---|---|

The water flood was run at constant rate of 1.0 ml/min at 185° F. through the core and the pressure and effluent fluid fractions were recorded. Synthetic Minas Brine was injected from the same end of the core as the oil only inverted in the gravity stable direction. The end saturation of oil after water flooding for 1.6 PV was 27.3% leaving 39.6 ml oil in core (OOIP) as listed in Table IV.

TABLE IV

BM-12 Water Flood Data

| Total Oil displaced | 49.00 cc |
|---|---|
| PV | 144.79 cc |
| Residual oil in core | 39.60 cc |
| Soi | 27.3% |

Water Permeability endpoint (kw)

| ΔP (psi) | q (cc/min) | k (mD) |
|---|---|---|
| 0.5 | 1.0 | 211.3 |

Water relative permeability endpoint ($k_{rw}°$)

| krw = | 0.171 |
|---|---|

The chemical flood consisted of 0.15 PV of 1.5% surfactant of Example 7 (CS2P), 0.5% surfactant of Example 5 (IO 0468/73L), 3% EGBE, 1.0 wt % $Na_2CO_3$ and 2000 ppm VHM AN-125 polymer in SSMB that was loaded in a flow loop and driven by 0.1 PV of polymer drive 1 composed of 1.5% EGBE, 0.9% $Na_2CO_3$, 2000 ppm VHM AN-125 polymer in SSMB and ~1.3 PV of polymer drive 2 composed of 1400 ppm VHM AN-125 polymer in SSMB. The fluids were injected at constant rate of 0.5 ml/min at 185° F. through the core. The pressure and effluent fluid fractions were recorded. The ASP slug viscosity was 10 cp at 185° F. and 10 $sec^{-1}$ and two polymer drives viscosity were 10 cp under the same conditions.

Rock Properties and Coreflood Properties:

TABLE 5

Summary of BR-01 Properties

| Length | 30 cm |
|---|---|
| Pore Volume | 141 mL |
| Porosity | 0.18 |
| Permeability | 1.3 Darcy |
| Soi | 60.6% |
| Sor | 28.4% |

TABLE 6

| Summary of BR-01 Properties During and After Surfactant | |
|---|---|
| Surfactant Slug | 0.25 PV of 0.5 wt % XC6438, 0.5 wt % XC6331, 1 wt % EGBE, 3000 ppm AN 125 and 1.1 wt % Na₂CO₃ |
| Polymer Chase | 1.5 PV of 2800 ppm AN 125 in SSRB |
| Peak Pressure Drop | 1.2 psi |
| Final Pressure Drop | 0.6 psi |
| Oil Recovery | 95% |
| Sor | 1.5% |

[1]Jackson, A. C. "Experimental Study of the Benefits of Sodium Carbonate on Surfactants for Enhanced Oil Recovery." MSE Thesis, University of Texas at Austin, December 2006.

What is claimed is:

1. An enhanced oil recovery composition comprising
    (a) a surfactant comprising an alkylated hydroxyaromatic sulfonate having the general formula:

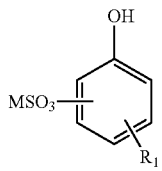

wherein $R_1$ is an alkyl group containing from about 8 to 40 carbon atoms and having from about 20% to about 50% methyl branching, and M is a mono-valent cation;
    (b) a solvent;
    (c) a passivator; and
    (d) a polymer.

2. The enhanced oil recovery composition of claim 1, wherein $R_1$ is derived from a partially isomerized alpha olefin.

3. The enhanced oil recovery composition of claim 1, wherein the mono-valent cation in the surfactant is an alkali metal, ammonium or substituted ammonium.

4. The enhanced oil recovery composition of claim 3, wherein the mono-valent cation is an alkali metal.

5. The enhanced oil recovery composition of claim 4, wherein the alkali metal is sodium.

6. The enhanced oil recovery composition of claim 1 wherein the composition further comprises at least one co-surfactant.

7. The enhanced oil recovery composition of claim 6 wherein the at least one co-surfactant is an isomerized olefin sulfonate.

8. The enhanced oil recovery composition of claim 7 wherein the isomerized olefin sulfonate is an alkali metal, ammonium or a substituted ammonium salt.

9. The enhanced oil recovery composition of claim 1, wherein the solvent is selected from the group consisting of an alcohol, ether alcohol, polyether alcohol, glycerol, polyether glycerol, glycol and polyether glycol.

10. The enhanced oil recovery composition of claim 1, wherein the passivator is a base.

11. The enhanced oil recovery composition of claim 10, wherein the base is an alkali metal hydroxide, alkali metal carbonate or alkali metal bicarbonate.

12. The enhanced oil recovery composition of claim 1, wherein the polymer is xanthum gum, polyacrylamide (PAM), partially hydrolyzed polyacrylamides (HPAM) or copolymers 2-acrylamido-2-methylpropane sulfonic acid or the sodium salt or mixtures thereof and polyacrylamide (AMPS) or mixtures thereof.

13. The enhanced oil recovery composition of claim 1, wherein the polymer is present in a concentration of from about 200 ppm to about 5000 ppm based on the total weight of the formulation.

14. The enhanced oil recovery composition of claim 1 wherein $R_1$ is an alkyl group containing from about 20 to 30 carbon atoms.

15. The enhanced oil recovery composition of claim 7 wherein the isomerized olefin sulfonate has the general formula:

$$R_2-SO_3X$$

wherein $R_2$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation.

16. The enhanced oil recovery composition of claim 6 wherein the at least one co-surfactant is an alkylaryl sulfonate.

17. A method of making an enhanced oil recovery composition comprising mixing
    (a) a surfactant comprising an alkylated hydroxy aromatic sulfonate having the general formula:

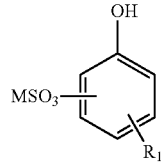

wherein $R_1$ is an alkyl group containing from about 8 to 40 carbon atoms and having from about 20% to about 50% methyl branching, and M is a mono-valent cation;
    (b) a solvent;
    (c) a passivator; and
    (d) a polymer.

18. A method of recovering crude oil from a subterranean hydrocarbon-containing formation which comprises
    (i) injecting into said formation an enhanced oil recovery, composition comprising
        (a) an alkylated hydroxyaromatic sulfonate having the general formula:

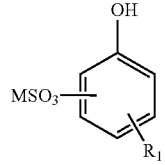

wherein $R_1$ is an alkyl group containing from about 8 to 40 carbon atoms and having from about 20% to about 50% methyl branching, and M is a mono-valent cation;
        (b) a solvent;
        (c) a passivator; and
        (d) a polymer, and
    (ii) recovering the crude oil from one or more production wells.

* * * * *